United States Patent [19]

Morgenthaler

[11] Patent Number: 4,876,098

[45] Date of Patent: Oct. 24, 1989

[54] METHOD OF ROLLING DOUGH

[75] Inventor: Eugen Morgenthaler, Kirchberg, Switzerland

[73] Assignee: Seewer AG, Burgdorf, Switzerland

[21] Appl. No.: 124,882

[22] Filed: Nov. 24, 1987

[30] Foreign Application Priority Data

Dec. 3, 1986 [DE] Fed. Rep. of Germany ....... 3641286

[51] Int. Cl.$^4$ .............................................. A21C 3/02
[52] U.S. Cl. .................................... 426/231; 425/172; 426/502; 426/517
[58] Field of Search ....................... 426/231, 502, 517; 425/194, 171, 172

[56] References Cited

U.S. PATENT DOCUMENTS

| 4,127,373 | 11/1978 | Anders et al. | 425/194 |
| 4,421,776 | 12/1983 | Brinkers et al. | 426/502 |
| 4,610,617 | 9/1986 | Christ et al. | 425/194 |
| 4,626,188 | 12/1986 | Morgenthaler et al. | 426/502 |

FOREIGN PATENT DOCUMENTS

| 2827522 | 1/1980 | Fed. Rep. of Germany . |
| WO83/00602 | 3/1983 | PCT Int'l Appl. . |
| 868217 | 5/1961 | United Kingdom . |

Primary Examiner—George Yeung
Attorney, Agent, or Firm—Salter & Michaelson

[57] ABSTRACT

The dough is led by a dough-conveyor belt between a fixed dough roller and a movable dough roller. After each pass of the strip of dough to be rolled out between the rollers, the movable dough roller is moved a predetermined step toward the fixed dough roller by means of a stepping motor, so that the roller gap between the dough rollers diminishes after each pass of the dough. The ratio of one roller gap to the next smaller roller gap changes after each step and decreases as dough rolling progresses. By means of programmable control circuitry, the diminishing of the roller gap is controlled during rolling-out of the strip of dough. Depending upon the type and condition of the dough, a suitable rolling curve can be selected for controlling the roller gap.

3 Claims, 6 Drawing Sheets

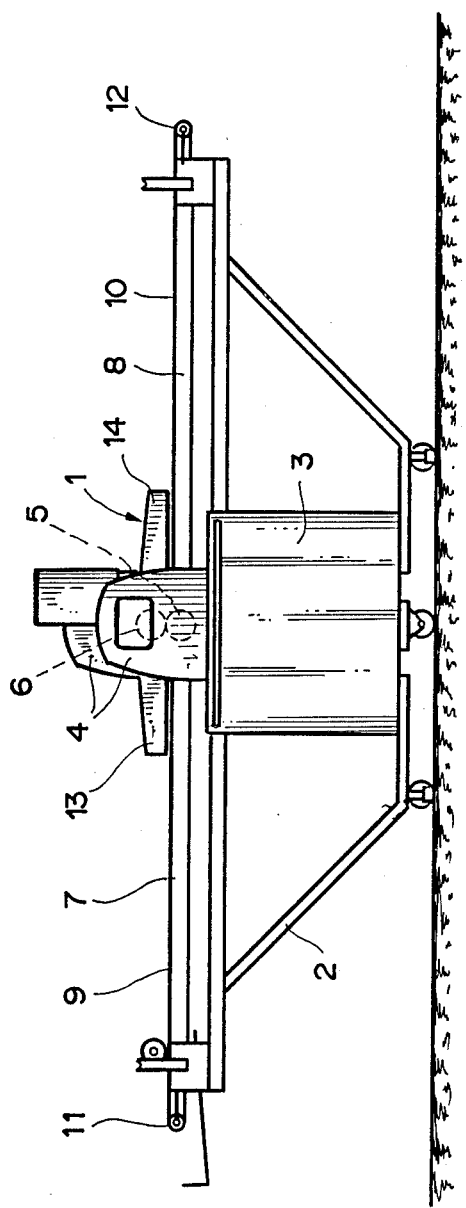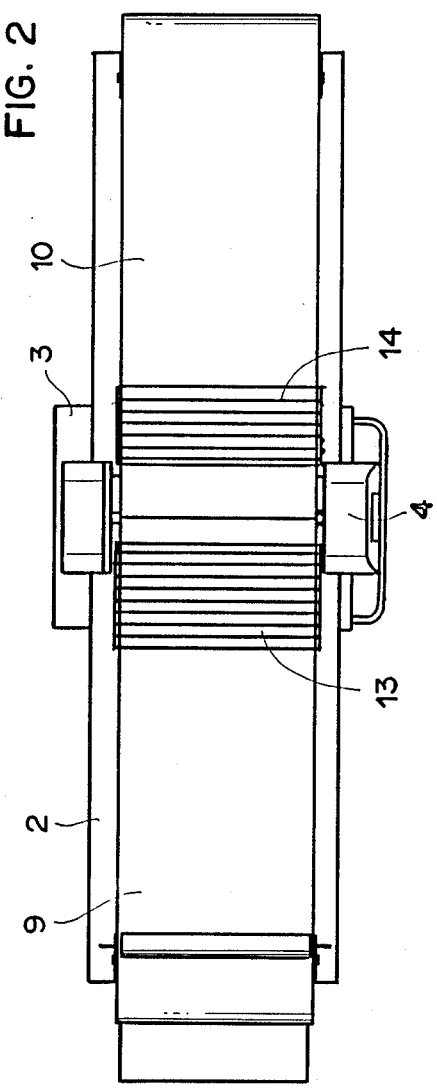

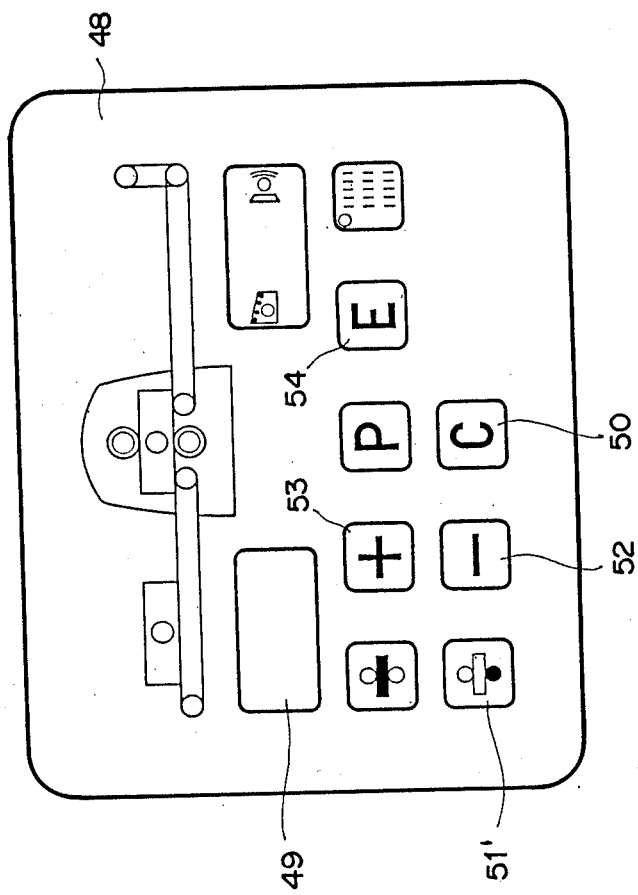

METHOD OF ROLLING DOUGH

This invention relates to the art of baking, and more particularly to a method for rolling out dough, of the type wherein the dough is led through by a dough-conveyor belt between a fixed and a movable roll-out cylinder, and after each pass of the strip of dough to be rolled out between the cylinders the movable roll-out cylinder is moved a specific distance toward the fixed roll-out cylinder by a controllable adjusting means, so that the roller gap between the roll-out cylinders decreases after each pass of the dough.

The invention further relates to a device for controlling the roller gap between two roll-out cylinders of a dough-rolling machine and to apparatus for driving the roll-out cylinders of a dough-rolling machine, of the type having a drive motor and a transmission, the driving shaft of which is provided with a gearwheel, and the axles of the dough-rolling cylinders are provided with gearwheels, a single drive means looping about the gearwheel connected to the outgoing shaft of the transmission, as well as about the gearwheels for driving the roll-out cylinders.

Dough-rolling machines having fixed conveyor-belt drives are used for simple rolling work in which the desired end thicknesses of the strip of dough to be rolled out are relatively great. If thin strips of dough are to be produced with such prior art dough-rolling machines, the feed steps of the movable dough roller must be determined by means of time-consuming experiments. Whether the values, once found, can be reproduced by the operator is questionable inasmuch as faulty adjustments are often made.

Furthermore, dough-rolling machines having variable conveyor-belt drives have been proposed, e.g., in European Patent Application Publication No. 0 125 583. With such machines, even exacting rolling work can be carried out, provided either that an operator monitors the operation and adjusts whatever feed-side belt speed is most favorable, or that this is done by means of expensve measuring and control apparatus as described in the aforementioned prior disclosure.

It is an object of this invention to provide an improved dough-rolling method, device, and apparatus for controlling the roller gap, by means of which the advantages of the aforementioned prior art machine can be achieved without the need for such great technical resources, whereby a more economical dough-rolling machine can be produced.

A further object of the inventon is provide a dough-rolling method, device and gap-control apparatus wherein the variation of the roller gap as a function of the feed steps can be optimally adapted to the type of dough, the condition of the dough, etc.

Still another object of the inventon is to provide apparatus for driving the dough rollers with fewer technical resources than the prior art apparatus.

To this end, in the method according to the present invention, of the type initially mentioned, the ratio of one cylinder spacing to the next smaller cylinder spacing becomes smaller as the cylinder spacing decreases.

The device according to the present invention for controlling the roller gap comprises an adjusting means for the selected adjustment of the movable roll-out cylnder after each pass of the strip of dough between the rolling-out cylinders, and programmable control circuitry for controlling the individual adjustment steps of the adjusting means.

The apparatus for driving the roll-out cylinders, of the type initially mentioned, comprises an adjustable linkage connected to the transmission shaft and to the adjustable roll-out cylinder for maintaining the necessary tension of the drive means.

A preferred embodiment of the invention will now be described in detail with reference to the accompanying drawings, in which:

FIG. 1 is a diagrammatic elevation of an automatic dough-rolling machine,

FIG. 2 is a top plan view of the machine of FIG. 1,

Figure 3:
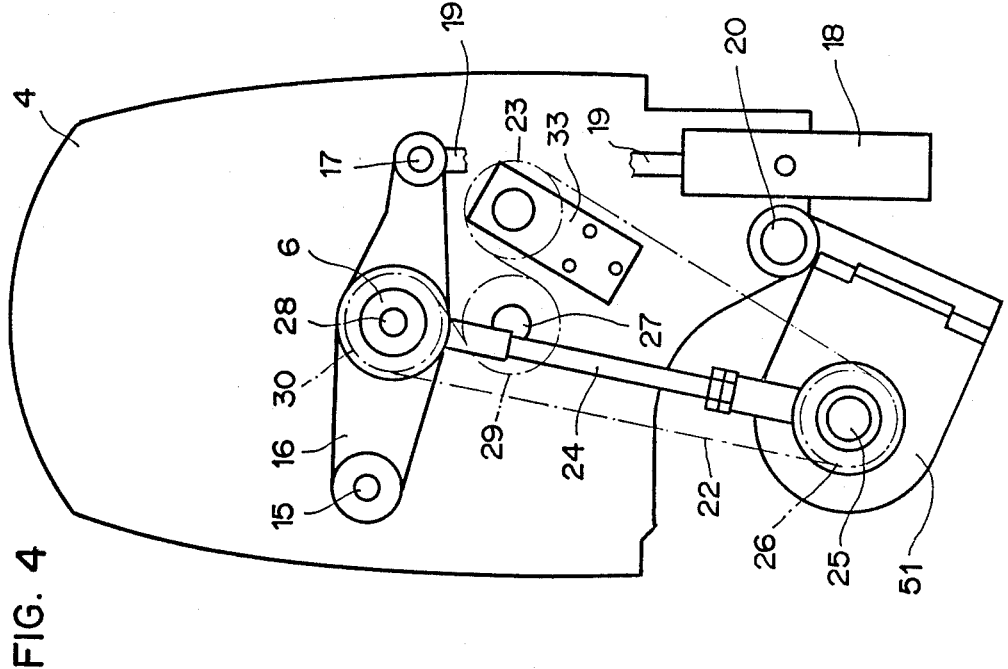
Figure 4:
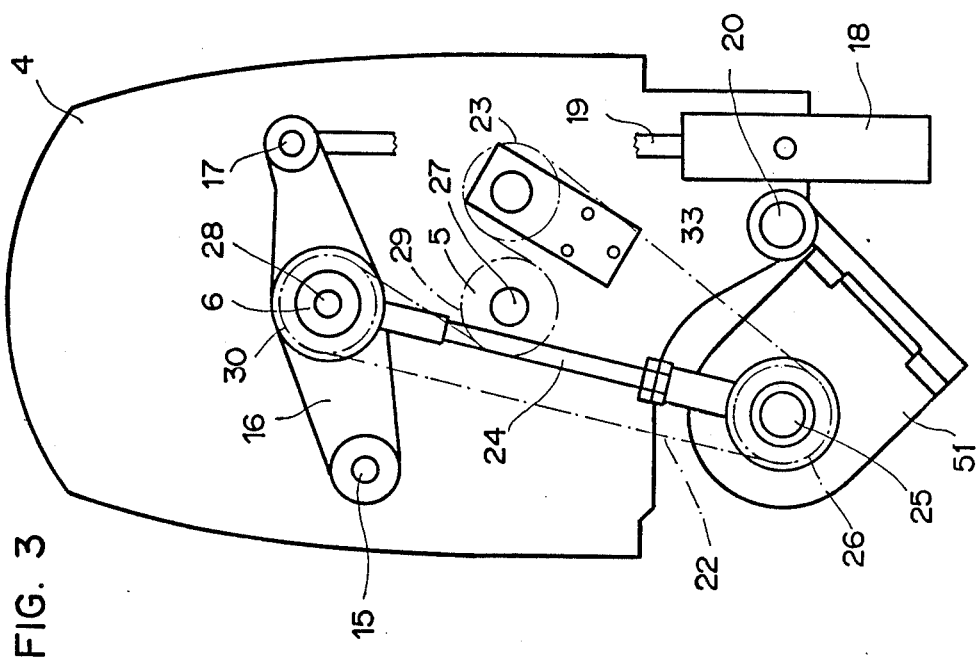
Figure 5:
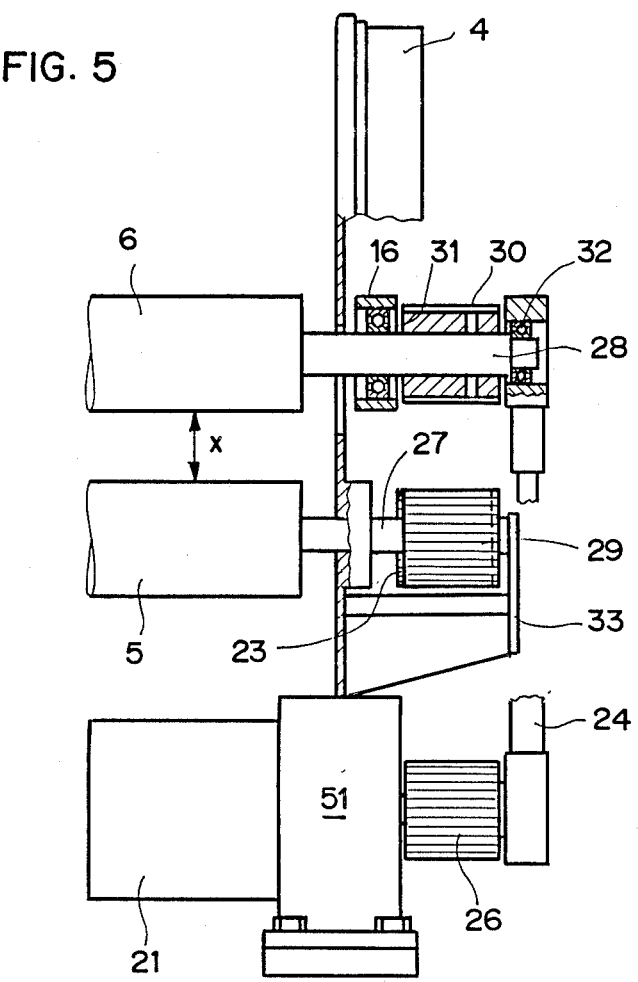
Figure 6:
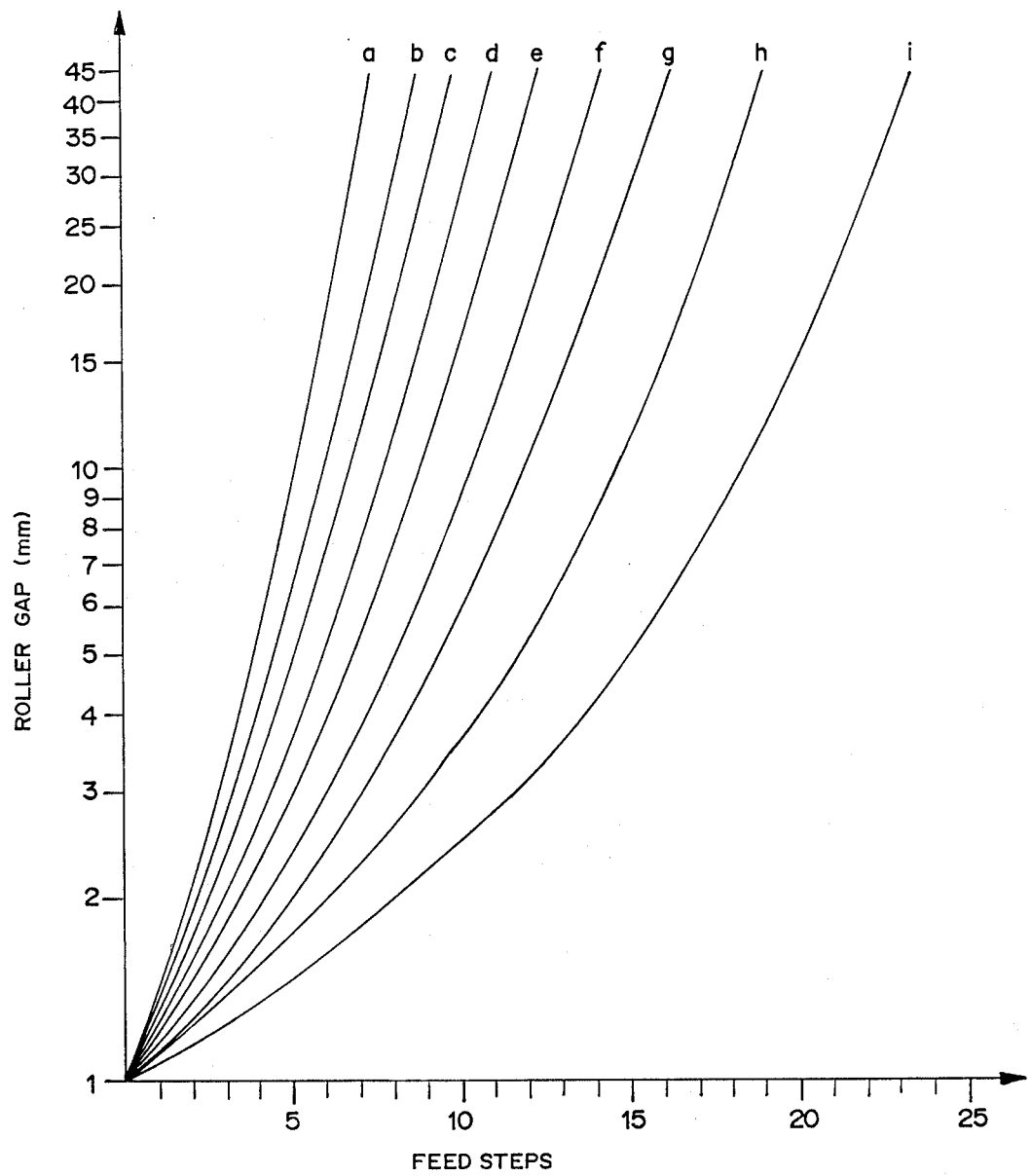
Figure 7:
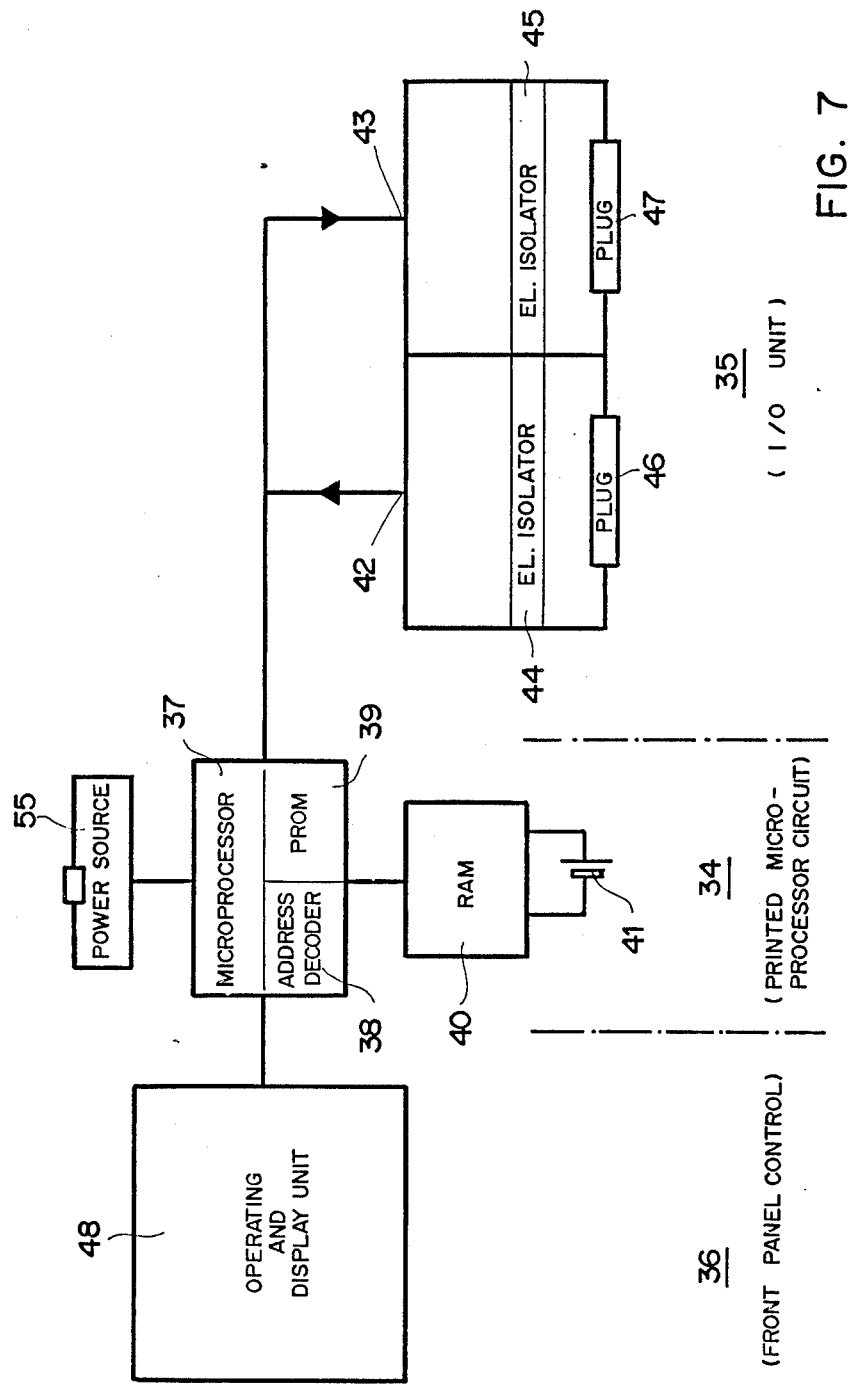

FIG. 3 is an elevation of the roller drive with the upper dough roller in an upper position, FIG. 4 is an elevation analogous to FIG. 3, but with the upper dough roller in a lower position, FIG. 5 is a side elevation, partially in section, of the roller drive of FIG. 3, FIG. 6 is a set of curves showing the roller gap as a function of the feed steps, FIG. 7 is a block diagram of the control circuitry, and FIG. 8 is a diagrammatic elevation of the operating and display unit for the dough-rolling machine.

The dough-rolling machine 1 illustrated in FIG. 1 comprises a frame 2 bearing a cental part 3 with drive housings 4 for driving dough rollers 5 and 6. Secured to the drive housings 4 are two support structures 7 and 8 for dough-conveyor belts 9 and 10 running over outer conveyor-belt rolls 11 and 12. Normally, the delivery belt runs faster than the entry belt. Also affixed to the drive housings 4 are hand-protectors 13 and 14.

A top plan view of the dough-rolling machine 1 may be seen in FIG. 2.

The roller drive of the housing 4 is shown in FIGS. 3 and 4. In FIG. 3, the upper, movable dough roller 6 is in an upper position, leaving a large roller gap open, while in FIG. 4, the upper roller 6 is in a lower position which leaves only a narrow gap between the lower roller 5 and the upper roller 6. The upper dough roller 6 is secured to a lever 16 rotatable about a pivot point 15. Fixed to the end 17 of the lever 16 remote from the pivot point 15 is a spindle 19 driven by a stepping motor 18. A DC motor having an incremental pick-up might, for example, be used instead of the stepping motor. A motor 21 swivellable about a pivot point 20 and having a transmission 51 drives the upper and lower dough rollers 5 and 6 via a toothed belt 22 guided over a guide pulley 23. The motor 21 also drives the dough-conveyor belts 9 and 10. An adjustable linkage 24 connects the transmission 51 of the motor 21 to the mid-region of the lever 16. By means of the linkage 24, the necessary tension of the toothed belt 22 can be maintained. The stepping motor 18 for regulating the roller gap is controlled by a microprocessor. A driving shaft 25 from the transmission 51 of the motor 21 is connected to a gearwheel 26 over which the toothed belt 22 is led. The lower and upper dough rollers 5 and 6 are also each connected via their axles 27 and 28 to gearwheels 29 and 30, respectively, over which the toothed belt 22 runs. The advantage of this arrangement is that a single toothed belt 22 loops about the lower and upper rollers 5 and 6, as well as about the gearwheel 26 connected to the driving shaft 25 of the transmission 51.

In FIG. 5, a side elevation of the roller drive illustrated in FIG. 3, the upper dough roller 6 is in an upper position, and the roller gap x is at its maximum, corresponding to the position at the beginning of the dough-rolling operation. This elevation, partially in section, also shows a bearing 31 for the driving shaft 28 of the upper dough roller 6 and a bearing 32 for the linkage 24.

FIG. 6 is a graph showing, as a dependent variable, the roller gap in mm as a function of the feed steps. A set of curves a–i is plotted. Depending upon the kind of dough, e.g., puff pastry, short pastry, etc., and upon the condition of the dough, e.g., cooled, etc., one of the rolling curves a–i is entered in the control circuitry for the automatic dough-rolling machine by means of the keys of an operating and display unit 48, whereupon a microprocessor 37 of the control circuitry controls the stepping motor 18 for the roller-gap adjustment accordingly (cf. FIG. 7). The ratio of one roller gap to the next smaller one is called the degree of rolling and decreases as rolling of the dough progresses. The ratio can become smaller after each step, or else alternately remain the same for at least two steps and then become smaller. First larger degrees of rolling are chosen, and as the dough is increasingly rolled out, smaller ones. If the machine is controlled by means of curve a, the least steps are necessary for rolling out the dough. With control by curve i, the most steps are required. However, all the curves exhibit falling degrees of rolling. Between these minimum and maximum curves, one of the curves b–h suitable to the dough can be chosen.

FIG. 7 is a block diagram of the control circuitry. This circuitry for controlling the roller gap substantially comprises a printed microprocessor circuit 34, and I/O unit 35, and a front panel control 36. The microprocessor circuit 34 comprises the microprocessor 37, an address decoder 38, a PROM 39, an application-program memory (RAM) 40 connected to the foregoing three elements, a back-up battery 41 for the RAM, and a power source 55. The elements 37, 38, and 39 are connected to outputs 42 and inputs 43 of the I/O unit 35. The outputs 42 and 43 are each connected via electrical isolators 44 and 45, respectively, e.g., opto-electronic couplers, to connection plugs 46 and 47, respectively. The elements 37, 38, and 39 are connected on the other side to the operating and display unit 48. At the input 43 there arrives, for instance, the indication from a light barrier that the strip of dough has passed between the dough rollers.

It is possible to store dough-adapted feed-step sequences which can be called up by the user.

FIG. 8 depicts the operating and display unit 48 of the control circuitry. It comprises a data display 49 and a number of keys 50 for setting twenty programs.

Twelve different rolling curves, the initial roller gap, and the final roller gap can be programmed, among other things.

The microprocessor calculates the steps to be carried out for the upper, movable dough roller 6 and gives the appropriate instructions to the roller stepping motor 18. The calculation takes place on the basis of the final roller gap.

The final roller gap can be adapted to changing dough conditions without these corrections being incorporated permanently in the program. The sequence of keys for modifying the final roller gap is then 51', 52 or 53, 54.

What is claimed is:

1. In a process for rolling out a strip of dough, comprising the steps of passing the strip of dough on a dough-conveyor belt between a fixed dough roller and a movable dough roller a plurality of times, and after each pass of the strip of dough to be rolled out between the rollers moving the movable dough roller a specific distance toward the fixed dough roller by means of a controllable adjusting means so that the roller gap between the dough rollers decreases after each pass of the strip of dough, the improvement comprising controlling the adjusting means by a programmable circuitry and reducing the ratio of one roller spacing to the next smaller roller spacing after at least one of said passing steps as the roller spacing decreases during the dough rolling process.

2. The method of claim 1, wherein said ratio is reduced after each passing step.

3. The method of claim 1, wherein the ratio of one roller spacing to the next smaller roller spacing alternately remains the same for at least two passing steps and then becomes smaller.

* * * * *